(12) United States Patent
Chidlovskii et al.

(10) Patent No.: US 7,730,396 B2
(45) Date of Patent: Jun. 1, 2010

(54) SYSTEMS AND METHODS FOR CONVERTING LEGACY AND PROPRIETARY DOCUMENTS INTO EXTENDED MARK-UP LANGUAGE FORMAT

(75) Inventors: Boris Chidlovskii, Meylan (FR); Hervé Dejean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 597 days.

(21) Appl. No.: 11/598,083

(22) Filed: Nov. 13, 2006

(65) Prior Publication Data
US 2007/0061713 A1 Mar. 15, 2007

Related U.S. Application Data

(63) Continuation of application No. 10/756,313, filed on Jan. 14, 2004, now Pat. No. 7,165,216.

(51) Int. Cl.
G06F 17/22 (2006.01)
(52) U.S. Cl. .................. 715/239; 715/234; 715/235; 715/236; 715/237; 715/238; 707/101
(58) Field of Classification Search .......... 715/234–250
See application file for complete search history.

(56) References Cited

U.S. PATENT DOCUMENTS

| | | | |
|---|---|---|---|
| 5,491,628 A | 2/1996 | Wakayama et al. | |
| 5,915,259 A | 6/1999 | Murata | |
| 5,920,879 A | 7/1999 | Kyojima et al. | |
| 5,970,490 A | 10/1999 | Morgenstern | |
| 6,480,865 B1 | 11/2002 | Lee et al. | |
| 6,487,566 B1 * | 11/2002 | Sundaresan | 715/235 |
| 6,569,207 B1 | 5/2003 | Sundaresan | |
| 7,036,073 B2 * | 4/2006 | Jones et al. | 715/237 |
| 7,134,072 B1 * | 11/2006 | Lovett et al. | 715/234 |
| 7,191,394 B1 * | 3/2007 | Ardeleanu et al. | 715/241 |
| 7,231,343 B1 * | 6/2007 | Treadgold et al. | 704/9 |
| 7,260,776 B2 * | 8/2007 | Moreau et al. | 715/234 |
| 7,552,382 B1 * | 6/2009 | Munetsugu et al. | 715/204 |
| 2002/0087571 A1 * | 7/2002 | Stapel et al. | 707/100 |

(Continued)

OTHER PUBLICATIONS

Frank M. Carrano et al., Data Abstraction and Problem Solving with C++, Walls and Mirrors, Addison Wesley Longman, Inc., 1998, p. 449.*

(Continued)

*Primary Examiner*—Doug Hutton
*Assistant Examiner*—Andrew R Dyer
(74) *Attorney, Agent, or Firm*—Oliff & Berridge, PLC

(57) ABSTRACT

A system and method that converts legacy and proprietary documents into extended mark-up language format which treats the conversion as transforming ordered trees of one schema and/or model into ordered trees of another schema and/or model. In embodiments, the tree transformers are coded using a learning method that decomposes the converting task into three components which include path re-labeling, structural composition and input tree traversal, each of which involves learning approaches. The transformation of an input tree into an output tree may involve decomposing the input document, labeling components in the input tree with valid labels or paths from a particular output schema, composing the labeled elements into the output tree with a valid structure, and finding such a traversal of the input tree that achieves the correct composition of the output tree and applies structural rules.

6 Claims, 12 Drawing Sheets

U.S. PATENT DOCUMENTS

| | | | |
|---|---|---|---|
| 2002/0157023 | A1 | 10/2002 | Callahan et al. |
| 2003/0069907 | A1* | 4/2003 | Moreau et al. ............... 707/513 |
| 2003/0097637 | A1 | 5/2003 | Tozawa et al. |
| 2003/0154444 | A1* | 8/2003 | Tozawa et al. ............... 715/513 |
| 2003/0167445 | A1* | 9/2003 | Su et al. ...................... 715/513 |
| 2004/0064475 | A1* | 4/2004 | Maeda et al. ............ 707/103 Y |
| 2004/0149826 | A1* | 8/2004 | Alleshouse .................. 235/432 |
| 2004/0181746 | A1* | 9/2004 | McLure et al. .............. 715/500 |
| 2004/0205592 | A1* | 10/2004 | Huang ......................... 715/513 |
| 2005/0114757 | A1* | 5/2005 | Sahota et al. ............ 715/501.1 |
| 2006/0173865 | A1* | 8/2006 | Fong ........................... 707/100 |
| 2009/0144248 | A1* | 6/2009 | Treadgold et al. ............... 707/3 |

OTHER PUBLICATIONS

XSL Transformations, Version 1.0, W3C, 1999, Introduction.*
Freitag, "Information Extraction from HTML: Application of a General Machine Learning Approach", American Association for Artificial Intellegence, 1998.
Carrano et al., "Data Abstraction and Problem Solving with C++: Walls and Mirrors," Addison Wesley Longman, Inc. 1998, pp. 449-451.

* cited by examiner

| Domaines de compétences |
|---|
| • Génie logiciel, Interfaces Homme Machines |

| Formation |
|---|
| • *2002 : DEA Informatique.* Université de Savoie, Chambéry.<br>• *2001 : Maîtrise Informatique.* Université de Savoie, Chambéry.<br>… |

*FIG. 1*

```
<tbody>
<tr><td><b>Domaines de competences</b></td>
<tr><td>
    <span> Génie logiciel, Interfaces Homme Machines<span></td></tr>
<tr><td><b> Formation</b></td></tr>
<tr><td>
    <span><b>2002</b>:<i>DEA Informatique: Université de Savoie</i><span></td></tr>
<tr><td>
    <span><b>2001</b>:<i>Maîtrise Informatique: Université de Savoie</i></b><span></td></tr>
...
</tbody>
```

FIG. 2

```
<curriculum>
<competence>Génie logiciel, Interfaces Homme Machines</competence>
<formation>
    <elem>
        <annee>2002</annee>
        <titre>DEA Informatique</title>
        <affiliation>Université de Savoie</affiliation></elem>
    <elem>
        <annee>2001</annee>
        <titre>Maîtrise Informatique</titre>
        <affiliation>Université de Savoie</affiliation></elem>
</formation>
...
</curriculum>
```

*FIG. 3*

Search Results for 'tree automata'

...

Leon S. Levy, Aravind K. Joshi: Some Results in Tree Automata. STOC 1971: 78-85

...

Let $I$ be the candidate path index
define *AddAnnotation* (leaf $l$, class $c$):
$P(l,d)$ := set of reverse paths from $l$ of max length $d$
for each path $p \in P(l,d)$ do
    if $p \in I$ then
        occurrence$(p,c)$ := occurrence$(p,c)$+1
    else
    $n$ := the minimal prefix of $p$ not in $I$
    add the node $n$ in $I$
    occurrence$(n,c)$ := 1
endfor define *Classify* (leaf $l$):
*candidateList* := {}
for $i$ in $1, ..., d$ do
    $P(l,i)$ := set of reverse paths from $l$ of depth $i$
    for each path $p$ in $P(l,i)$ do
        if $p \in I$ then
            $s, c, cf$ := rule in $p$ with the highest confidence
            if $cf = 1$ then return $c$
            else add *(c, cf)* to *candidateList*
    endfor
endfor
return class $c$ with the highest *cf* in *candidateList*

FIG. 13

SYSTEMS AND METHODS FOR CONVERTING LEGACY AND PROPRIETARY DOCUMENTS INTO EXTENDED MARK-UP LANGUAGE FORMAT

This is a Continuation of application Ser. No. 10/756,313 filed Jan. 14, 2004, now U.S. Pat. No. 7,165,216. The disclosure of the prior application is hereby incorporated by reference herein in its entirety.

BACKGROUND OF THE INVENTION

1. Field of Invention

This invention relates to electronic document format conversion.

2. Description of Related Art

Many companies and organizations that own data and documents in electronic form continuously face a problem of migrating their legacy documents into new document formats, that allow performance of operations in a most cost effective and efficient manner. This efficiency is obtained by sharing meta-information in the document. A standard formalism for encoding this meta-information and data exchange is extendable mark-up language (XML). This conversion process has two main steps. The first step involves design of a rich and highly structured document model. The second main step involves conversion of legacy documents into the new document model. The conversion process not only transforms legacy documents from an existing format into a new one, such as, for example, from Microsoft Word® into extended mark-up language, but also customizes information which is not explicitly encoded in legacy documents.

For Microsoft Word® documents, for example, there exist several conversion solutions available on the Internet, for example, and from Microsoft Corporation itself. These conversion solutions use a proprietary model to save the document content along with all structural, layout and mark-up instructions. Although the document content is converted into a standard structure format, this solution is often insufficient from a users point of view, as it addresses not the document content with associated semantics, but instead addresses how the document content is to be visualized. As a result, the document structural tags are mark-up and/or layout orientated.

U.S. Pat. No. 5,491,628, the disclosure of which is hereby incorporated herein in its entirety by reference, discloses a method and apparatus for converting a first document to a second document where the first document is in a first extended attribute grammar, while the second document is in a second extended attribute grammar. An extended attribute coupling grammar couples the first and second extended attribute grammars. The first document is converted to a first tree, which is partially copied to a first copy. The first copy is completed by evaluating it's attribute with respect to the extended attribute coupling grammar. The first copy is then a partially attributed tree of the second document. The partially attributed tree is completed to form a second tree based on the second extended attribute grammar. The second tree is then converted to the second document.

U.S. Pat. No. 5,915,259, the disclosure of which is hereby incorporated herein in its entirety by reference, discloses a computer-based method for providing the generation of schemas for output documents. An output schema representing a desired output condition of a document is created from inputs comprising a tree transformation rule defined by at least a pattern, a contextual condition, an input schema, and user specified parameters. A match-identifying tree automaton is created from the one pattern, the contextual condition, and the input schema; and the match-identifying tree automaton is modified with respect to the user specified parameters.

U.S. Pat. No. 5,920,879, the disclosure of which is hereby incorporated herein in its entirety by reference, discloses a document structure conversion apparatus which performs processing for complementation and composes document structure according to a desired document class.

U.S. Pat. No. 5,970,490, the disclosure of which is hereby incorporated herein in its entirety by reference, discloses a method for processing heterogeneous data including high level specifications to drive program generation of information mediators, inclusion of structured file formats (also referred to as data interface languages) in a uniform manner with heterogeneous database schema, development of a uniform data description language across a wide range of data schemas and structured formats, and use of annotations to separate out from such specifications the heterogeneity and differences that heretofore have led to costly special purpose interfaces with emphasis on self-description of information mediators and other software modules. The method involves inputting a high level transformation rule specification.

U.S. Pat. No. 6,480,865, the disclosure of which is hereby incorporated herein in its entirety by reference, discloses a method for annotating eXtensible Markup Language (XML) documents with dynamic functionality. The dynamic functionality comprises invocations of Java objects. These annotations belong to a different name space, and thus a Dynamic XML-Java (DXMLJ) processor recognizes elements within the XML document that are tagged with DXMLJ prefix tags, processes each of these tags, and transforms the XML document accordingly.

U.S. Pat. No. 6,487,566, the disclosure of which is hereby incorporated herein in its entirety by reference, discloses a system for specifying transformation rules of Extensible Markup Language (XML) documents into other XML documents, wherein the rule language used is XML itself. The transformation rule specifications identify one or more transformations of the document to be performed when a pattern match occurs between the document and a source pattern. The specifications are used to define class specifications for objects that perform the transformations. The invention provides a pattern matching language, known as PML, that performs pattern matching and replacement functions for transforming any XML instance to any other XML instance. The PML pattern language is comprised of a sequence of rules expressed in XML, wherein each rule has four main components: (1) a source pattern (pat); (2) a condition (cond); (3) a target pattern (tgt); and (4) an action part (action).

U.S. Pat. No. 6,569,207, the disclosure of which is hereby incorporated herein in its entirety by reference, discloses a system for generating class specifications from extensible markup language (EML) schemas and then instantiating objects from those class specifications using data contained in XML documents.

Schemas describe what types of nodes may appear in documents and which hierarchical relationships such nodes may have. A schema is typically represented by an extended context-free grammar. A tree is an instance of this schema if it is a parse tree of that grammar.

In this regard, it should be noted that an extended markup language (XML) schema specifies constraints on the structures and types of elements in an XML document. The basic schema for XML is the DTD (Document Type Definition). Other XML schema definitions are also being developed, such as DCD (Document Content Definition), XSchema, etc. The main difference between DTD and DCD is that DTD uses a different syntax from XML, while DCD specifies an XML schema language in XML itself. XSchema is similar to DCD in this respect. In spite of the differences in the syntax, the goals and constraint semantics for all these XML schema languages are the same. Their commonality is that they all describe XML Schema. This means that they assume the common XML structure, and provide a description language to say how these elements are laid out and are related to each other.

Extracting information from documents, including Internet website documents, involves dealing with a diversity of information indexing schemes and formats. Analyzing the results returned by search engines and putting the parsed answers into a unified format, including storing the extracted information within a unified format, is known as "wrapping" the information.

Information extraction may use different approaches. One approach, called the local view approach, involves information extraction from unstructured and semi-structured text, wherein a wrapper is an enhancement of a basic HTML parser with a set of extraction rules. See, in this regard, D. Frietag, "Information extraction from html: Application of a General machine learning approach," *Proc. AAAI/AAI*, pp. 517-523, 1998. An extraction rule often has a form of delimiters, or landmarks, that are a sequences of tags preceding, or following, an element to be extracted. For example, delimiter <td> <a> requires a text token to be preceded by tags <td> and <a>. The local view approach, which uses local delimiters in a context-less manner limits the expressive power of the delimiter-based wrappers.

The global view approach assumes that HTML pages are instances of an unknown language and attempts to identify this language. The global view benefits from grammatical inference methods that can learn finite-state transducers and automata from positive examples, although often requiring many annotated examples to achieve a reasonable generalization.

SUMMARY OF THE INVENTION

The systems and methods according to this invention convert legacy and proprietary documents into extended mark-up language format. In various exemplary embodiments, this involves transforming ordered trees of one schema and/or model into ordered trees of another schema and/or model.

Various exemplary embodiments of the systems and methods according to this invention provide a learning method that decomposes the conversion task into three components: path re-labeling, structural composition, and input tree traversal. Each of the three components involves learning approaches.

In various exemplary embodiments, the resulting documents follow a proprietary model. In the case of extended mark-up language, this is a proprietary document type definition. The resulting documents contain meta-information not only on the document layout, but also for accompanying or user specific customized information.

Various exemplary embodiments of the systems and methods according to this invention make use of a proprietary document format as a starting point, because such a format is more informative than a plain text representation, in order to convert a document from the editor document legacy model into a user defined document model according to a document type definition provided or customized by a user.

Various exemplary embodiments of the systems and methods according to this invention convert legacy documents into a new document fitting a specific document type definition and applying a set of structural transformations.

Various exemplary embodiments of the systems and methods according to this invention adopt the learning methodology of first learning the structural transformations from available examples of transformations, and then applying these transformations to a set of legacy documents. Because the systems and methods of this invention are based on learning techniques, they typically use a set of couples, such as, for example, an initial document and a customized document, as training data for finding an optimal set of transformation rules.

Various exemplary embodiments of the systems and methods according to this invention transform documents from one schema to another schema by targeting a specific transformation case, namely, the document conversion with no content changes in the documents, that automates the conversion, and excludes programming. Further, in various exemplary embodiments, the conversion rules are learned from training data.

Various exemplary embodiments of the systems and methods according to this invention formalize a conversion task at a transformation and/or mapping from one class of labeled ordered trees into another class of labeled ordered trees.

Various exemplary embodiments of the systems and methods according to this invention involve a divide-and-conquer approach to the conversion problem which divides the initial task of conversion into three subtasks and employs learning methods for each of these three subtasks.

Various exemplary embodiments of the systems and methods according to this invention reduce the learning of complex transformations to three complementary small learning problems: (1) learning labeling rules which will label content fragments with valid output paths; (2) learning structural rules which will instruct a program how to compose labeled elements in a valid tree according to an output schema; and (3) learning traversal rules which will instruct a parser how to visit a node of an input tree to allow the correct composition of an output tree that is grouping or nesting labeled elements in output documents.

Various exemplary embodiments of the systems and methods according to this invention represents HTML/XML documents as unranked ordered trees. Unranked trees may be annotated/encoded into their binary trees in several ways, including one which preserves the adjacency relationship between children of an inner node.

BRIEF DESCRIPTION OF THE DRAWINGS

FIG. 1 shows a fragment of a student curriculum vitae in Microsoft Word® bullet format;

FIG. 2 shows a simplified hypertext mark-up language source of the fragment of FIG. 1;

FIG. 3 shows a conversion of the documents of FIGS. 1 and 2 into a user-defined extended mark-up language format;

FIG. 13 is an algorithm showing two exemplary embodiments to obtain candidate the path index of FIG. 12.

DETAILED DESCRIPTION OF EXEMPLARY EMBODIMENTS

Figure 4:
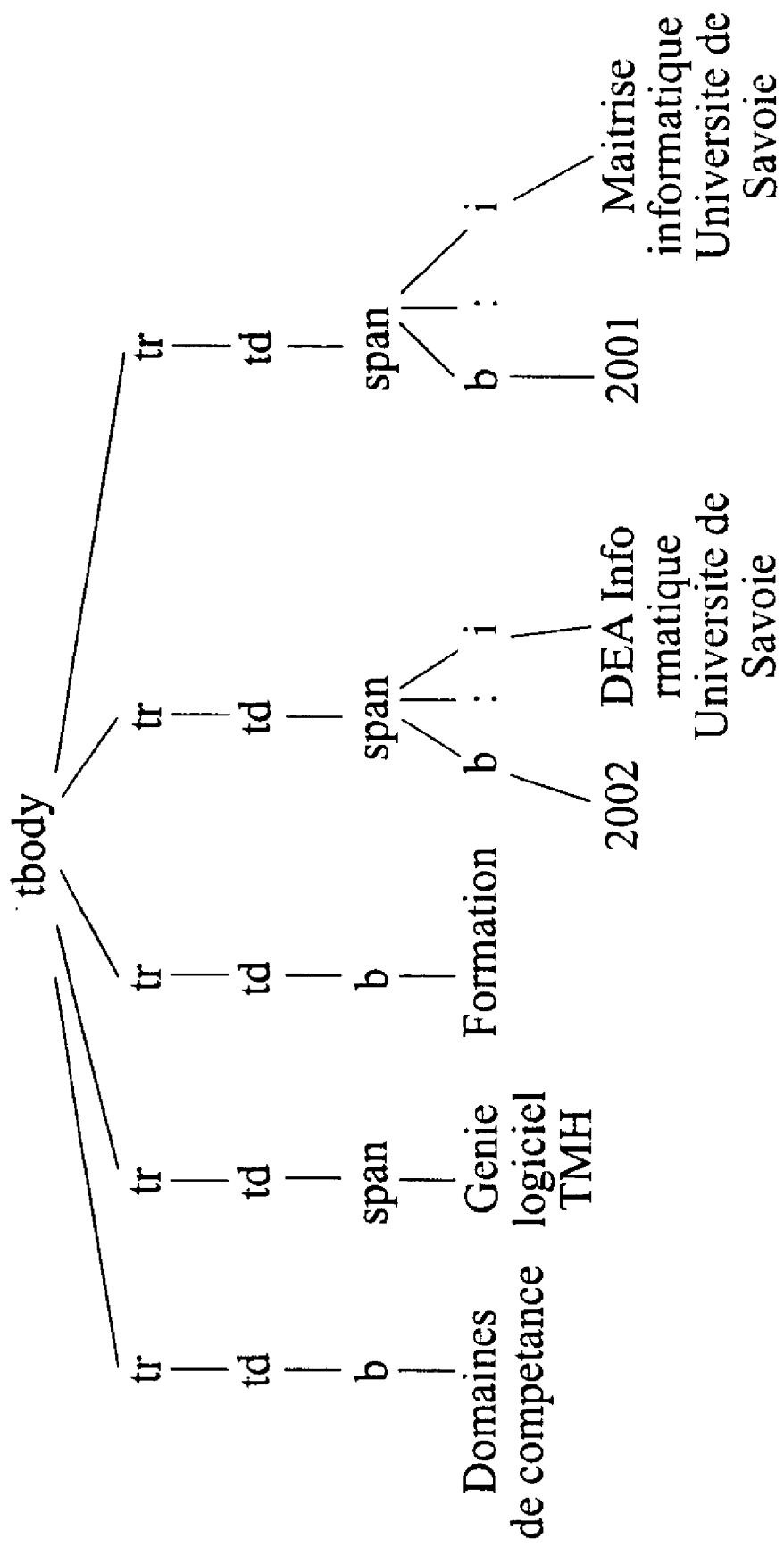
FIG. 4 shows a tree representation of the input hypertext mark-up language fragment.

Various exemplary embodiments of the systems and methods according to this invention use structured documents in a proprietary format as a starting point because these documents are more informative than a plain text representation. These proprietary format structured documents are used to convert a document from an editor legacy document model into a user-defined document model according to a document type definition, using a set of structural transformations.

Various exemplary embodiments of the systems and methods according to this invention adopt a learning methodology which first learns the structural transformations from available examples of transformations, and then applies these transformations to the set of legacy documents.

Various exemplary embodiments of the systems and methods according to this invention, because they are based on learning techniques, use a set of couples, such as, for example, an initial document and a customized document as training data for finding an optimal set of transformation rules.

In an exemplary embodiment of the systems and methods according to this invention, curriculum vitae documents which are in Microsoft Word® format are converted into extended mark-up language with a given extended mark-up language schema definition. The exemplary embodiment concerns students of French Universities that use a Microsoft Word® editor and integrated templates for creating their curriculum vitae. The exemplary embodiment also assumes access to a document collection with an important number of student curriculum vitae. The task of converting the student curriculum vitae from Microsoft Word® format into extended mark-up language affords itself to the learning approach of the systems and methods of this invention because the number of templates used by the students is limited, and therefore, the conversion rules can be learned from quite a small number of conversion examples. Each conversion example may be an input Microsoft Word® document, and a conversion of the input Microsoft Word® document in extended mark-up language according to a given extended mark-up language schema definition.

FIG. 1 shows a fragment of a student curriculum vitae in French. The curriculum vitae reports all relevant issues including personnel data, competence domains, obtained degrees, studies and other elements. Structure of the curriculum vitae, including paragraphs, titles and subtitles, fonts and layout elements, are selected in a human reading of the curriculum vitae. The curriculum vitae content elements are shown as organized to ease information capturing. Microsoft Word® uses a proprietary format. However, like many other formats it may be converted into hypertext mark-up language or Microsoft® extended mark-up language format.

A somewhat simplified hypertext mark-up language source of the fragment of FIG. 1 is set forth in FIG. 2. The hypertext mark-up language fragment of FIG. 2 can be represented as a tree with internal nodes containing different layout instructions and leads containing fragments of the document content.

The result of an exemplary conversion of the initial document fragment into user-defined extended mark-up language according to the systems and methods of the invention is shown in FIG. 3. The mapping of input schema trees like the one in FIG. 2 into output schema trees like the one in FIG. 3 is accomplished according to the systems and methods according to this invention. Transformation of the schema tree in FIG. 2 into the schema tree of FIG. 3 exemplifies the issues relevant to conversion from one tree-like structure, such as, for example, XML/HTML, to another tree-like structure. A schema tree is made up of schema nodes. Each schema node has attributes such as, for example, a label and a type.

Regarding the exemplary embodiment of FIG. 3, it should be understood that certain elements do not appear in the output, some content elements become names of semantic tags, and some elements get split into two elements. Additionally, the nesting of elements in an output tree does not necessarily correspond to the nesting of some elements in the input tree.

Figure 5:
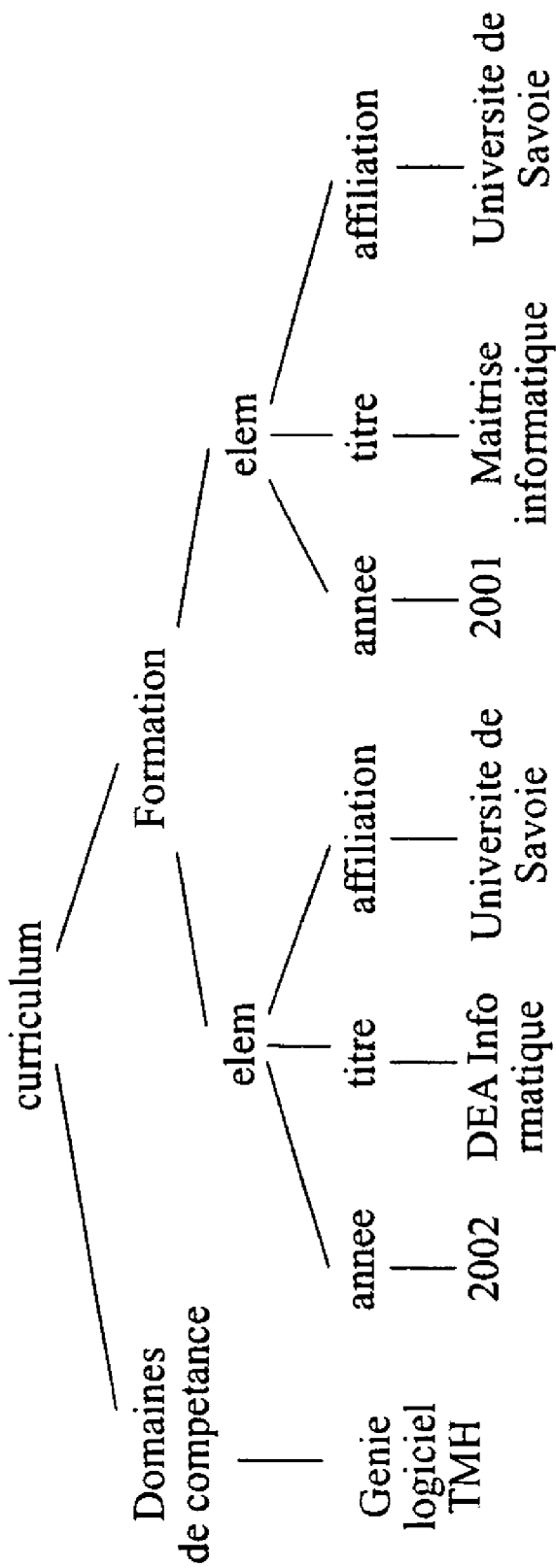
FIG. 5 shows a tree representation of an output extended mark-up language fragment.

FIG. 4 is a tree representation of the input hypertext mark-up language fragment, which may be generated, for example, as disclosed in the incorporated U.S. Pat. No. 5,970,490. FIG. 5 is a tree representation of the output extended mark-up language fragment. Various exemplary embodiments of the systems and methods according to this invention target a specific transformation case, namely, the document conversion where there are few or no content changes in the document. However, various exemplary embodiments of the systems and methods according to this invention provide a solution that automates the conversion, excludes programming (used, for example, in the aforementioned U.S. Pat. No. 6,487,566) and learns conversion rules from training data.

Various exemplary embodiments of the systems and methods of this invention include information extraction and entity classification of plain text documents as well as the inference of transducers that convert strings of input alphabet into strings of output alphabet. Various exemplary embodiments of the systems and methods according to this invention provide a divide and conquer approach to the conversion problem involving dividing the initial task of conversion into three subtasks and then applying learning methods for each of these three subtasks.

The conversion problem, i.e., conversion of legacy and proprietary documents into extended mark-up language format through transforming ordered trees of one schema and/or model into ordered trees of another ordered schema and/or model, may be defined as follows. Assume that two collections of input and output documents are covered by hypertext mark-up language and/or the extended mark-up language Schema $G_1$ and $G_2$. Each schema defines the structure, element types and the composition of valid documents in Schemas $G_1$ and $G_2$. Reference is made, in this regard, to aforementioned incorporated U.S. Pat. No. 5,491,628 to explain structural components of a document and details of a document transformation in terms of a mapping from attributed trees of a source extended attribute grammar to attributed trees of a result extended attribute grammar. In other words, the U.S. Pat. No. 5,491,628 patent presents an example of a transformation of documents from a given schema to a modified schema. In various exemplary embodiments of the systems and methods according to this invention, an input tree $t_1$ is transformed into an output tree $t_2$ containing three components. The first component labels content elements in $t_1$ with valid paths from Schema $G_2$. The second component composes the labeled elements into tree $t_2$ with a valid structure. The third component finds such a traversal of input tree $t_1$ that guarantees the correct composition of $t_2$ and application of structural rules.

Accordingly, various exemplary embodiments of the systems and methods according to this invention reduce the learning of complex transformation to three complementary smaller learning functions. The first learning technique $L_1$ is learning labeling rules which will label content elements in input documents with valid output paths. The second learning technique $L_2$ is learning structural rules which instruct the program how to compose the labeled elements in a valid tree according to the output Schema $G_2$. The third small learning technique $L_3$ is learning traversal rules which instruct a parser how to visit a node of input tree $t_1$ to allow the correct composition of output tree $t_2$, that is grouping or nesting of labeled elements in the output documents.

Table 1 shows the labeling rules and structural rules for the curriculum vitae conversion example given in FIGS. 2-5. Labeling rules relate to defining which type of a node defined in the input document schema $G_1$ to which the type of a node defined in the output document Schema $G_2$ is converted. Structural rules relate to defining actions that accompany the labeling rules and connect labeled elements in a valid output document. When conversion is executed, each node included in a document structure according to the document schema $G_1$ is converted to each node included in another document structure according to the document schema $G_2$ one by one based upon a predefined rule. In Table 1, one row represents one rule and each rule contains labeling and structural parts. Each rule is 4-tuple, i.e., a set of four related values. In this exemplary embodiment of the systems and methods of the invention, the four related values are input pattern, output pattern, before action and after action, where "input pattern" (2nd column in Table 1) defines a condition that triggers the rule, "output pattern" (3rd column in Table 1) is a labeling part of the rule, and "before action" and "after action" ($5^{th}$ and $6^{th}$ columns in Table 1) are structural parts of the rule. For any rule, the input pattern is in the XPath notation and the output pattern gives either 1) the valid output path in XPath notation, or 2) none in bold type for elements not presented in the output documents, or 3) a composition of output paths with a special post-processing required to complete the transformation of a content fragment.

All three cases of output patterns are present in Table 1. Rules 1 and 2 provide valid output paths for labeling elements, and in rules 4 and 5, the output label is "none". Finally, rule 3 is an example of output path composition; it indicates that any content element in input document with input path /tbody/tr/td/span/i is a composition of two output paths (/curr/formation/elem/titre and /curr/formation/elem/affiliation), interleaved with a ":" separator. According to this rule, the content element "Maîtrise informatique: Université de Savoie" (whose path p matches the input path pattern, see FIG. 4) cannot be labeled with one output label; it should be post-processed and split into two fragments. The content fragment before ":" (namely, "Maîtrise informatique") will be labeled as /curr/formation/elem/titre, and the fragment after ":" (that is, "Université de Savoie") will labeled as /curr/formation/elem/affiliation.

According to the systems and methods of this invention, the structural part of any rule is defined as actions that can be performed before and/or after the labeling steps. The before and after actions are introduced for the sake of convenience. Eventually, they can be represented in a way that assumes one uniform scenario, when actions are performed either before or after labeling steps.

According to such a uniform scenario, an input document is parsed (in a certain traversal manner, that is discussed later) and the conversion rules are applied to all content elements (located in leaves of the document tree) in the following way. If path p of a content element matches an input path pattern of one of the conversion rules, the application of this rule might take up to three steps. First, the system executes the before action, if any. Then, according to the output pattern, the system either labels the content element with output path, or ignores it (if the output pattern is none), or proceeds with post-processing defined in the pattern. Finally, the system executes the after action, if any.

The introduction of the before and after actions is due to the fact that the path re-labeling only may not be sufficient in some instances to build the output tree, because it may leave unclear how the obtained paths composes the output tree. For example, from a pair of paths (/A/B/C, /A/B/D), at least two trees can be built if the order is fixed (/A/B/[C,D] and /A/[B/C,B/D]), and even more trees if the order can be changed. Rules in Table 1 instruct how to disambiguate the composition of output tree. As an example, rule 2 says that outputting a content element labeled as "/curr/formation/elem/annee" should be preceded by creating node"/curr/formation/elem/"; this means that any "/curr/formation/elem/annee" element in the output document is always the first son of element "/curr/formation/elem".

$I_P$ is a set of valid paths in the input documents, which are derived from input Schema $G_1$. Respectively, $O_P$ is the set of valid paths derived from output Schema $G_2$. In various exemplary embodiments of the systems and methods according to this invention, the pattern set over $I_P$ is the set of path patterns where any pattern is an XPath expression to find on the input path $I_P$. The first learning task $L_1$ is to learn a mapping (or re-labeling) function from input paths $I_P$ into output paths $I_P$, $L_1: I_P \rightarrow O_P$. Labeling content elements in input documents does not require following any special order of visiting elements. In other words, labels can be assigned independently. Accordingly, for learning task $L_1$, the systems and methods according to this invention can apply any classification method either known or hereinafter developed by the machine learning community, such as Bayesian classifiers, decision trees, Support Vector Machines, etc. The generic learning framework assumes that a number of input documents (like in FIG. 2) is annotated according to output schema (like in FIG. 3) and provided as training data for a corresponding learning algorithm that generates a set of classification rules according to the underlying learning model (Bayesian, tree of decisions, SVM, etc.)

For the structure actions, the task $L_2$ is defined as finding a mapping from classification rules determined by task $L_1$ to structural actions, where any action is defined as either in bold type open or bold type closed on an output path, $L_2$: $I_P \rightarrow \{Open, Close\} \times O_P$. Unlike learning task $L_1$, composition of valid output trees assumes an order of visiting nodes in a tree. Accordingly, not generic classification rules, but methods of learning finite-state automata or transduction rules are more likely to work better for $L_2$.

Unlike learning task $L_1$ that works with both input and output documents, $L_2$ identifies the structural actions from output documents only. Its goal is to avoid ambiguity when composing output trees out of content elements annotated with output paths. To achieve the goal, the system uses output schema $G_2$ and resolves the ambiguity problem by applying the constraints the schema imposes on the structure of output documents.

Assume that two consequent elements with output paths $p_1$ and $p_2$ should be "connected" in the output document. If $p_1$ and $p_2$ have a common prefix p, then there exists |p| different ways to glue $p_1$ and $p_2$, where |p| is the length of p. In FIG. 3, when content element "2001" is labeled as $p_2$=/curr/formation/elem/annee, the previous element is labeled as $p_1$=/curr/formation/elem/affiliation, and the common prefix for $p_1$ and $p_2$ is p=/curr/formation/elem. Therefore, there exist three possible ways to connect $p_2$ to $p_1$:

/curr/formation/elem/[affiliation,annee],
/curr/formation/[elem/affiliation,elem/annee], and
/curr/[formation/elem/affiliation,formation/elem/annee].

To make a correct choice, we look how the output Schema $S_2$ defines the structure and nesting of elements in output documents. Assume $G_2$ is given in the DTD form and defines elements 'formation' and 'elem' as follows:

<!ELEMENT formation (elem*)>
<!ELEMENT elem (annee, titre, affiliation)>

According to this definition, each "elem" begins with "annee" element and ends with "affiliation" element. Provided that the last element put in the output document is /curr/formation/elem/affiliation, the system can infer that appending a new "/curr/formation/elem/annee" element to the output document should be preceded by creating a new "elem" element. The corresponding structural rule "open /curr/formation/elem" will be associated with the rule for re-labeling "annee" elements.

According to various exemplary embodiments of the systems and methods of this invention, input documents may be traversed in different orders to guarantee application of structural rules and correct composition of output documents. In certain cases sub-trees of an internal node may be visited in "natural" manner, as they appear in a file, from left to right. However, in other cases, the sub-trees should be visited differently, for example, from right to left (we will show an example below). Accordingly, the systems and methods according to this invention need not follow any a-priori selected traversal order because that may lead to conversion failure. Rather, the systems and methods according to this invention may test various approaches and execute one that guarantees the correct composition of output documents. An example of node visiting is set forth below.

Various exemplary embodiments of the systems and methods according to this invention provide three ways of traversing a non-binary tree. Two of these approaches are the same as with binary trees, that is, Pre-Order and Post-Order, when node N is visited before and/or after visiting sub-trees of N. Moreover, a list of sub-trees can be visited in left-to-right or right-to-left order. In-Order traversal defined for binary trees can be generalized to non-binary trees as In-Order[i] traversal when node N is visited after visiting i sub-trees. Moreover, the systems and methods according to this invention may change the traversal mode when visiting a hypertext mark-up language page and a specific order can be associated with certain tag names, for example, in the document type definition, or complex types, for example, in the case of extended mark-up language schemas.

Traversal type is given by the combination of visiting a node and its sub-trees, TrType={Pre, Post, In[i]}×(Left-to-Right, Right-to-Left). Without a loss of generality, the systems and methods according to this invention may assume that any output tree is generated in the conventional (Pre, Left) order. Traversal Tr of an input tree $t_1$ is given by the set of traversal rules for Tr={(tag, tr)|tag ∈ $G_1$, tr ∈ TrType}, where a given traversal type can be associated with any tag type in the input HTML\XML document. Traversal Tr is optimal for the conversion task if it produces such an order of node visiting in $t_1$ that matches the generation order of the corresponding output tree $t_2$.

It should be emphasized that detecting an optimal traversal requires routine experimentation with input and output documents based on the guidelines set forth herein. Fixing one a priori traversal method would unnecessarily limit the systems and methods of the invention disclosed herein.

For the curriculum vitae exemplary embodiment disclosed herein, there are several possible optimal traversals, one of which applies the (Pre-Order, Left-to-Right) traversal to all tags in the input HTML files, that is, $Tr_{opt}$={(tag, (Pre, Left-to-Right)} where tag ∈ {tbody, tr, td, spam, b, i}.

The curriculum vitae exemplary embodiment disclosed herein involves relatively simple traversals, whereas in other conversions, more complex traversals may be used. For example, assume that Schema $G_2$ requires a different order of elements in output documents. In other words, say it requires that element "annee" appears after elements "titre" and "affiliation", that is, it defines element "elem" as follows:
<!ELEMENT elem (titre, affiliation, annee)>.

To obtain the correct output, a sub-tree with tag i in each /tbody/tr/td/span element may be visited before sub-tree with tag b. In other words, sub-trees of any "span" tag in the input document should be traversed from right to left. An optimal traversal would apply the (Pre-Order, Left-to-Right) traversal to all tags except "span" tag. This last "span" tag would be traversed using (Pre-order, Right-to-Left) order.

According to the various exemplary embodiments of the systems and methods of this invention there may exist many optimal traversals for a given conversion task and finding an optimal traversal depends upon the adopted extended mark-up language schema formalism. For the document type definition schema formalism where any element is associated with a tag name, the number of possible traversals is finite. For example, there exist at most 2*(2+d)*k possible traversals of input trees, where k in the number of tag names in the input document type definition and d is the maximum number of sub-trees in input trees. For any traversal Tr of an input tree t, the verification of whether Tr is optimal takes a time linear in the tree size, O(|t|) and verification if the traversal Tr is optimal for collection C of input documents takes O($\Sigma_{t \in C}$|t|). Accordingly, the existence of optimal traversal for a conversion task among 2*(2+d)*k possible traversals can be verified in O(d*k|C|) time, where |C| is the size of collection C, defined as |C|=$\Sigma_{t \in C}$|t|.

Figure 6:
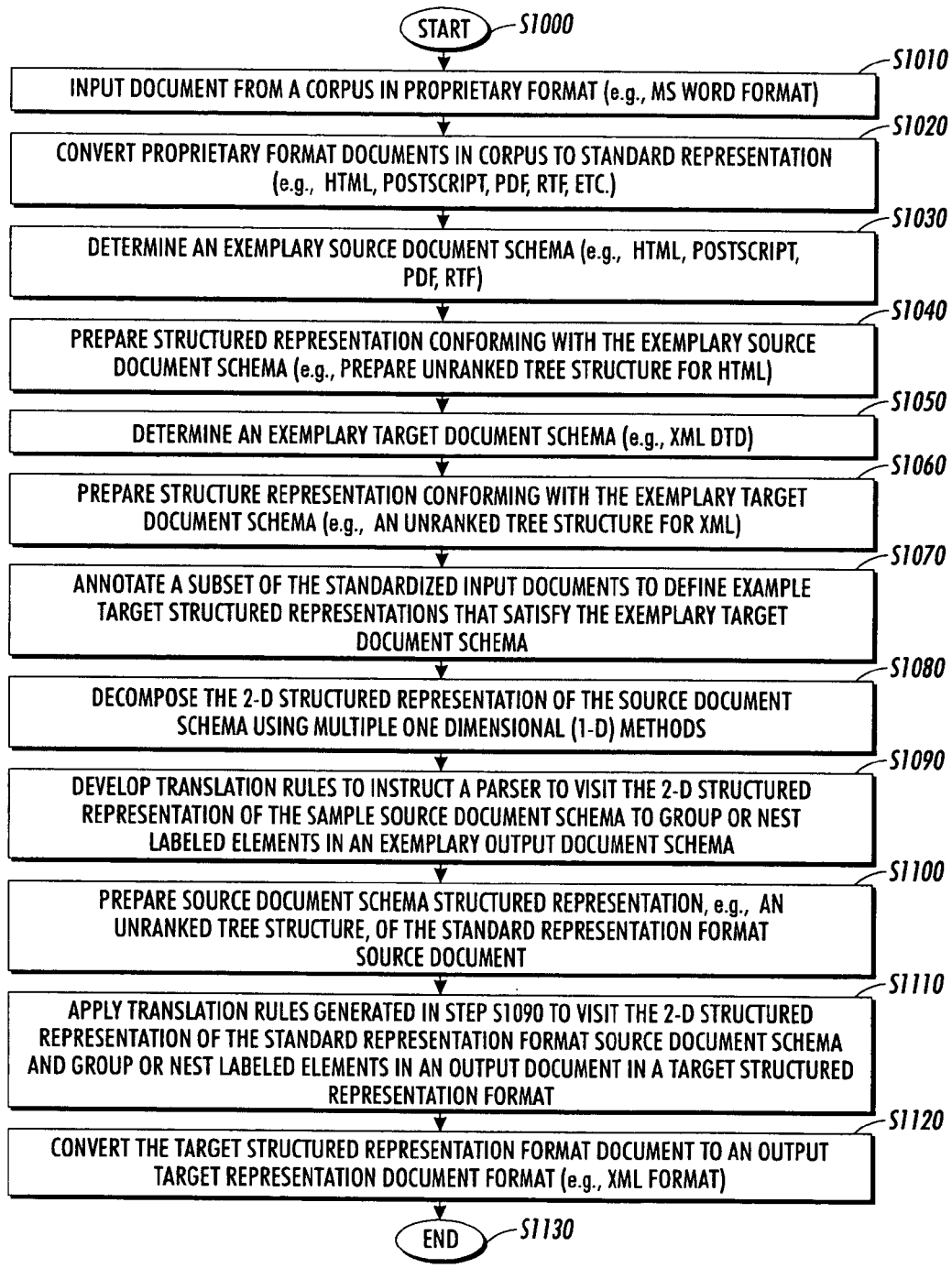
FIG. 6 is a generalized flowchart of an exemplary embodiment of a method according to this invention.

FIG. 6 is a generalized flowchart of a first exemplary embodiment of a method according to this invention. Control starts in step S1000 and proceeds to step S1010. In step S1010, documents from a corpus, or body, of documents in a proprietary format, such as, for example, Microsoft Word® format, are input. Next, control proceeds to step S1020, where the documents input in step S1010 are converted to a standard representation, such as, for example, HTML, Postscript, PDF, RTF, etc. Then, control moves to step S1030, where an exemplary source document schema, such as, for example, HTML, Postscript, PDF, RDF, etc., is determined. Next, control proceeds to step S1040, where a structured representation conforming with the exemplary source document schema is prepared. In one exemplary embodiment, this may involve preparing an unranked tree structure for HTML. Next, in step S1050, an exemplary target document schema, such as, for example, XML DTD, is determined.

Figures 9, 10:
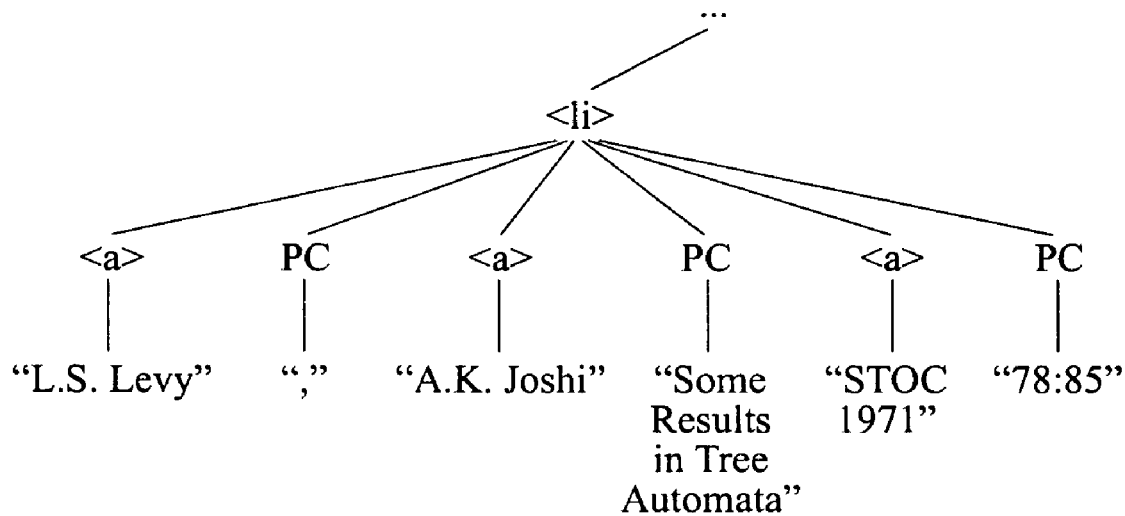
FIG. 9 is an exemplary sample HTML fragment.
FIG. 10 is an exemplary unranked tree form of the HTML fragment of FIG. 9.

FIG. 10 shows an HTML fragment of an answer to a query presented to an Internet search engine. Then, control proceeds to step S1060, where a structure representation conforming with the exemplary target document schema, such as, for example, an unranked tree structure for XML, is prepared. The unranked tree for the HTML source fragment with the text values associated with the tree leaves is shown in FIG. 10. Next, control proceeds to step S1070, where a subset of the standardized input documents is annotated, i.e., encoded into its binary tree, to define exemplary target structured representations that satisfy the exemplary target document schema.

Figure 11:
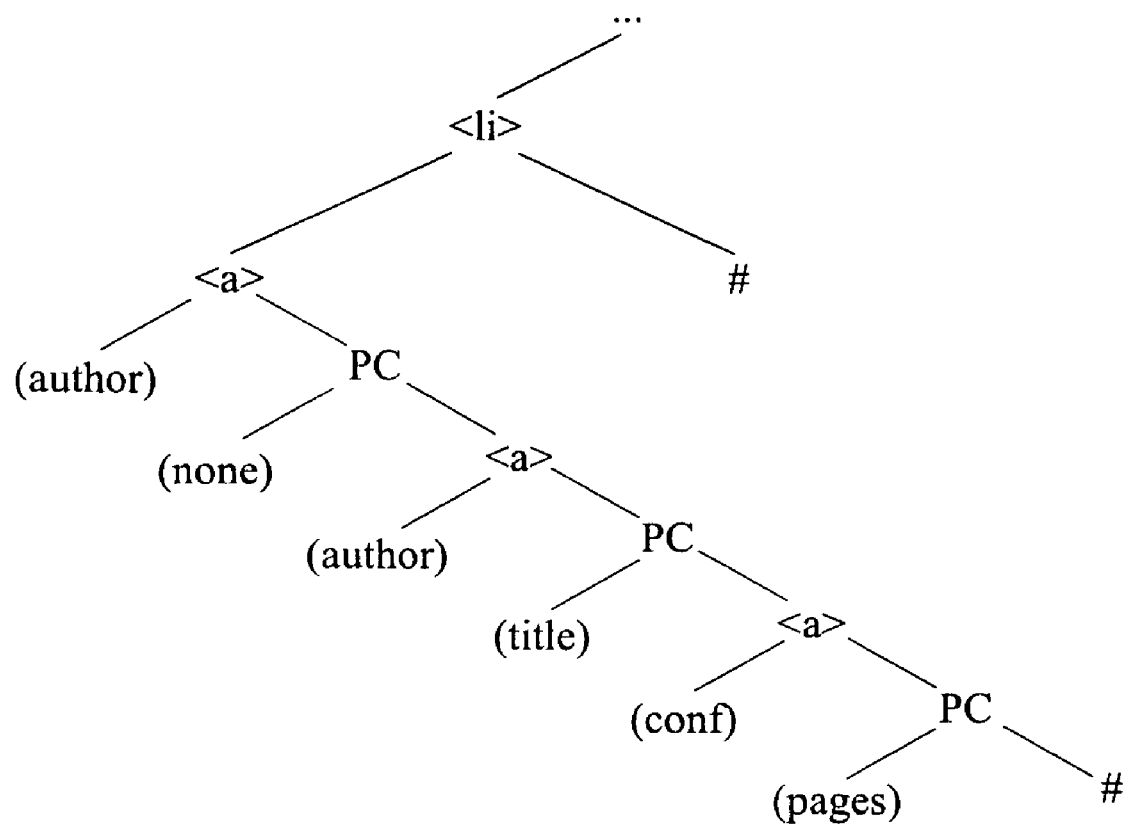
FIG. 11 is an exemplary encoded and annotated binary tree form of the unranked tree form of FIG. 11.

FIG. 11 shows the binary tree encoding of the unranked tree of FIG. 10, as well as the annotation of leaves with classification labels. Binary trees like the ones shown in FIGS. 5 and 11 serve as the training set for the wrapper learning systems and methods according to this invention.

Then, control proceeds to step S1080, where the two-dimensional (2-D) structured representation of the source document schema is decomposed using multiple one-dimensional (1-D) methods.

Figure 7:
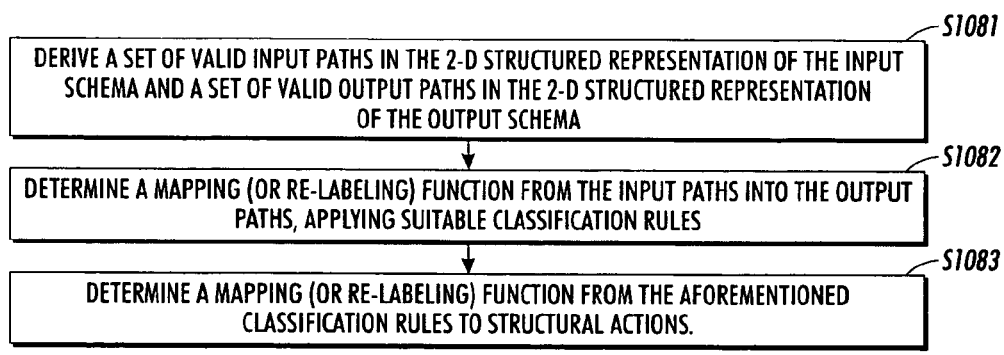
FIG. 7 is a flowchart showing an exemplary embodiment of a method of expanding step S1080 of FIG. 6.

FIG. 7 shows one exemplary embodiment of performing step S1080. In step S1081, a set of valid input paths in the 2-D structured representation of the input schema is derived and a set of valid output paths in the 2-D structured representation of the output schema is derived. Then, control proceeds to step S1082, where a mapping and/or re-labeling function is determined from the input paths into the output paths, applying suitable classification rules. Next, control proceeds to step S1083, where a mapping and/or re-labeling function is determined from the aforementioned classification rules to structural actions.

Figure 8:
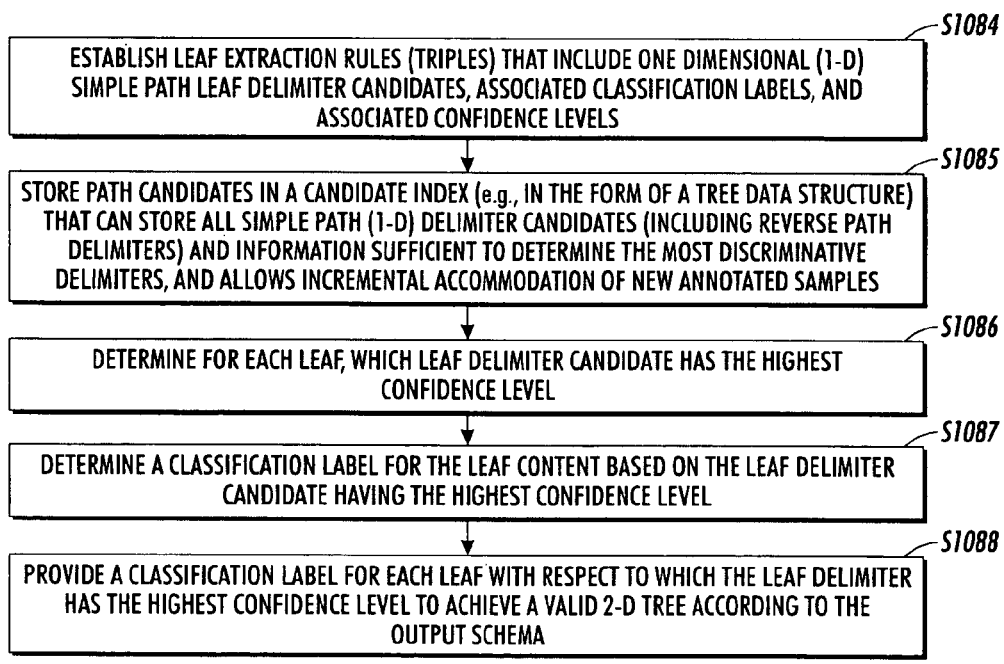
FIG. 8 is a flowchart showing an exemplary embodiment of a method of expanding step S1083 of FIG. 7.

FIG. 8 shows an exemplary embodiment of performing step S1082. In step S1084, leaf extraction rules (triples) that include one dimensional (1-D) simple path leaf delimiter candidates, associated classification labels, and associated confidence levels are established. Then control proceeds to step S1085 where path candidates are stored in a candidate index, such as, for example, in the form of a tree data structure, that can store all simple path (1-D) delimiter candidates, including reverse path delimiters, and information sufficient to determine the most discriminative delimiters, and that allows incremental accommodation of new annotated samples. Next, control goes to step S1086, where a determination is made for each leaf, of which leaf delimiter candidate has the highest confidence level. Then, control moves to step S1087, where a determination is made of a classification label for the leaf content based on the leaf delimiter candidate having the highest confidence level. Then, control proceeds to step S1088, where a classification label is provided for each leaf with respect to which leaf delimiter has the highest confidence level to achieve a valid 2-D tree according to the output schema.

The technique for finding the most discriminative 1-D delimiters for leaf content will be referred to in the following as "tree wrapping." The learning of tree wrappers requires exploring a large space of leaf delimiters and discovering such ones that provide the most accurate classification. In order to control the exponentially growing number of candidate delimiters in the trees, an important subclass of tree wrappers, where leaf delimiters are simple paths in a binary tree, is employed.

A simple path delimiter is topologically equivalent to a simple path in a tree, i.e., all its nodes except the root have one child, and only the root may have one or two children. A simple path has two extremes, one extreme is the associated leaf and another extreme is an inner node or another leaf. The length of a simple path is given by the number of nodes in the path. One specific case is root-to-leaf paths in a tree, when each leaf in the tree is associated with the path starting in the tree root and terminating in the leaf.

To incrementally determine a good set of delimiters from annotated samples, we store the path candidates in a special data structure called candidate index. The goal of the index generation is two-fold. On one side, the index stores all delimiter candidates, as well as an additional information sufficient to determine the most discriminative delimiters. On the other side, the index allows to incrementally accommodate new annotated samples.

The candidate path index stores reverse paths, which are special encodings of simple paths; a reverse path starts at the annotated leaf and traverses tree arcs of three types; they are denoted Up ($\uparrow$), Left ($\leftarrow$) and Right ($\rightarrow$). For example, reverse path $\uparrow$ PC$\rightarrow$# encodes the delimiter PC (*, #) of the pages leaf.

The index is a trie data structure where all nodes except the root are labeled with tags from $\Sigma'$ and each transition is typed with $\uparrow$, $\leftarrow$ or $\rightarrow$. A path in the index from the root to any node corresponds to a reverse path and is a delimiter candidate. Additionally, each index node includes occurrences for all classification labels surrounded by the corresponding sub-tree in annotated documents.

Figure 12:
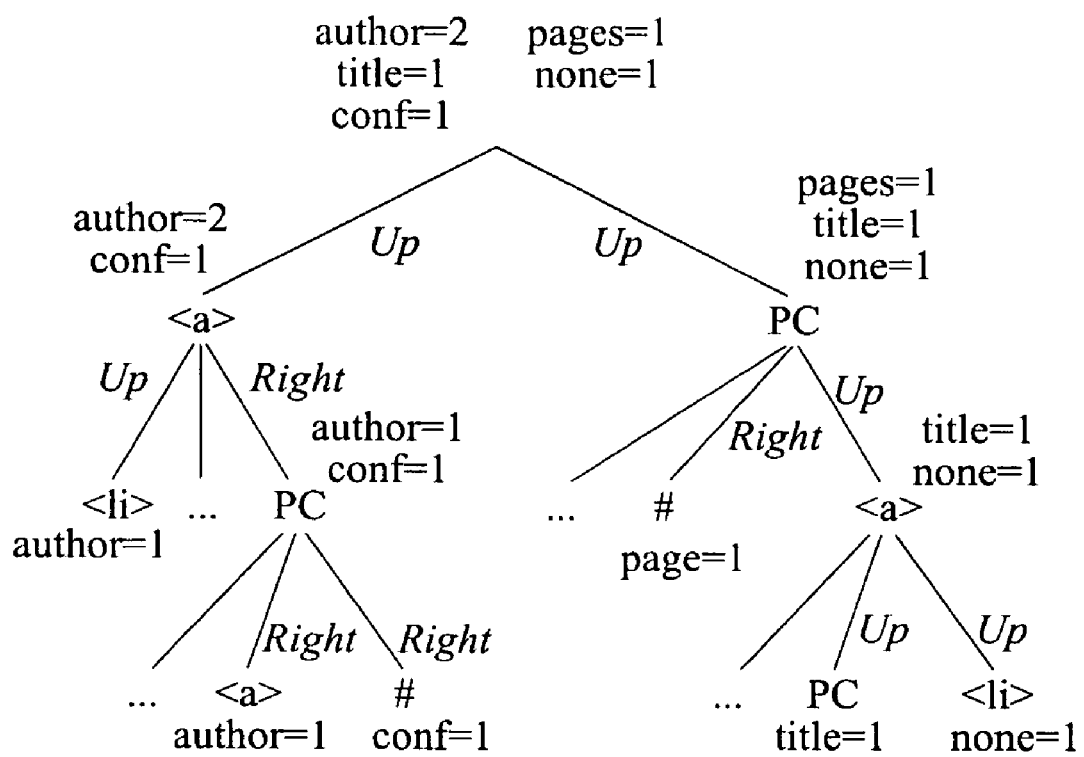
FIG. 12 is a fragment of a candidate path index for the tree of FIG. 9.

FIG. 12 shows a fragment of candidate path index of the sample HTML fragment in FIG. 10. In the index, node for the reverse path $\uparrow$ <a> indicates that the corresponding sub-tree surrounds two author leaves and one conf leaf. For the candidate index of the depth d=3, there exists a set of perfect extraction rules as follows:

($\uparrow$ <a> $\uparrow$ <li>, author, 1),
($\uparrow$ <a> $\rightarrow$ PC $\rightarrow$ <a>, author, 1),
($\uparrow$ <a> $\rightarrow$ PC $\rightarrow$ #, conf, 1),
($\uparrow$ PC $\rightarrow$ $\leftarrow$ #, pages, 1),
($\uparrow$ PC $\uparrow$ <a> $\uparrow$ <li>, none, 1),
($\uparrow$ PC $\uparrow$ <a> $\uparrow$ PC, title, 1).

Like delimiters in the string wrappers, path delimiters are one-dimensional objects. However, unlike string wrappers, the algorithm exploits a larger (two-dimensional) space of simple paths in the tree in order to detect paths that are highly discriminative for the leaf classification but are "invisible" in the string presentation of HTML documents.

To manage the candidate index, one may, for example, use simple criteria, e.g., list the index depth by some value d>1. FIG. 13 presents two routines for the index. Procedure AddAnnotation( ) updates the index with the path candidates surrounding a new annotated leaf. Function Classify(l) finds a classification label for a tree leaf. It implements the wide-first traversal through the intersection of the candidates in the index and simple paths starting in a leaf to be labeled.

The aforementioned method of information extraction from tree documents was evaluated by testing the aforementioned tree wrappers on 14 "easy" sites, including Google®, Altavista®, Excite®, CNN®, ACM®, Elsevier®, DBLP Author, DBLP Title and some others for which string wrappers in the form of regular transducers have been successfully learned (that is, with the F-measure superior to 98%); the wrappers manage to find out highly discriminative delimiters for all classification labels. Second, the method was tested on 6 "complex" sites including IEEE®, CSbiblio®, Medline® and Cora® from the Iwrap® collection, and IAF® and Shakespeare® from the Kushmerick® collections, for which the string wrappers obtain the average precision of 89.6% and recall of 84.3%.

For each site, 10 annotated documents were available for a series of 5 experiments. In each experiment, both string and tree wrappers have been trained from 3 randomly selected annotated pages and tested on other 7 pages. For each group of sites, the precision/recall and the time a wrapper takes to parse a page and to classify the tree leaves were tested. Experiments were run with the maximal depth d=8 of the candidate index. The results of experiments are summarized in Table 2; the TRatio measure is a ratio of time a tree wrapper processes a page to the time the corresponding string wrapper processes the same page.

For 140 annotated HTML pages in the group of easy sites, an average page has 503.2 leaves to classify. Tree wrappers for these sites are as accurate as the string wrappers (see Table 2). However they are slower; on average, a tree wrapper spends 6.51 seconds to parse a page while a string wrapper spends 3.16 seconds only. This happens because a tree wrapper verifies multiple paths surrounding a leaf against delimiters of the extraction rules.

TABLE 2

Comparison of string and tree wrappers.

| Sites | String Wrappers | | Tree wrappers | | |
|---|---|---|---|---|---|
| | Prec | Rec | Prec | Rec | TRadio |
| Easy | 100 | 98.8 | 99.8 | 99.1 | 2.06 |
| Complex | 89.6 | 84.3 | 96.3 | 92.6 | 3.21 |

For the group of complex sites, an average annotated page has 478.9 leaves to classify. Tree wrappers are here more efficient in finding accurate delimiters and obtain precision of 96.3% and recall of 92.6%. Instead, on average, a tree wrapper spends 3.21 more time to process a page than a string parser.

Returning to FIG. 6, after step S1080 is completed, control proceeds to step S1090, where translation rules are developed to instruct a parser to visit the 2-D structured representation of the sample source document schema to group and/or nest labeled elements in an exemplary output document schema. Reference is made in this regard to Table 1 and the discussion of Table 1, infra.

Next, control proceeds to step S1100, where a source document schema structured representation, such as, for example, an unranked tree structure, of the standard representation format source document is prepared. Then, in step S1110, translation rules generated in step S1090 are applied to visit the 2-D structured representation of the standard representation format source document schema and group and/or nest labeled elements in an output document in a target structured representation format to convert the source structured representation to the target structured representation by using the learned traversal or default traversal to traverse the input document structured representation to (a) label target structured representation with output document labels for identified input document path patterns; and perform structural composition of the target structured document. Then, in step S1120, the target structured representation format document is used to generate the output document format, such as, for example, XML format, by, for example, using a browser to read target structured representation. Then, control proceeds to step S1130, where the process ends.

Figure 14:
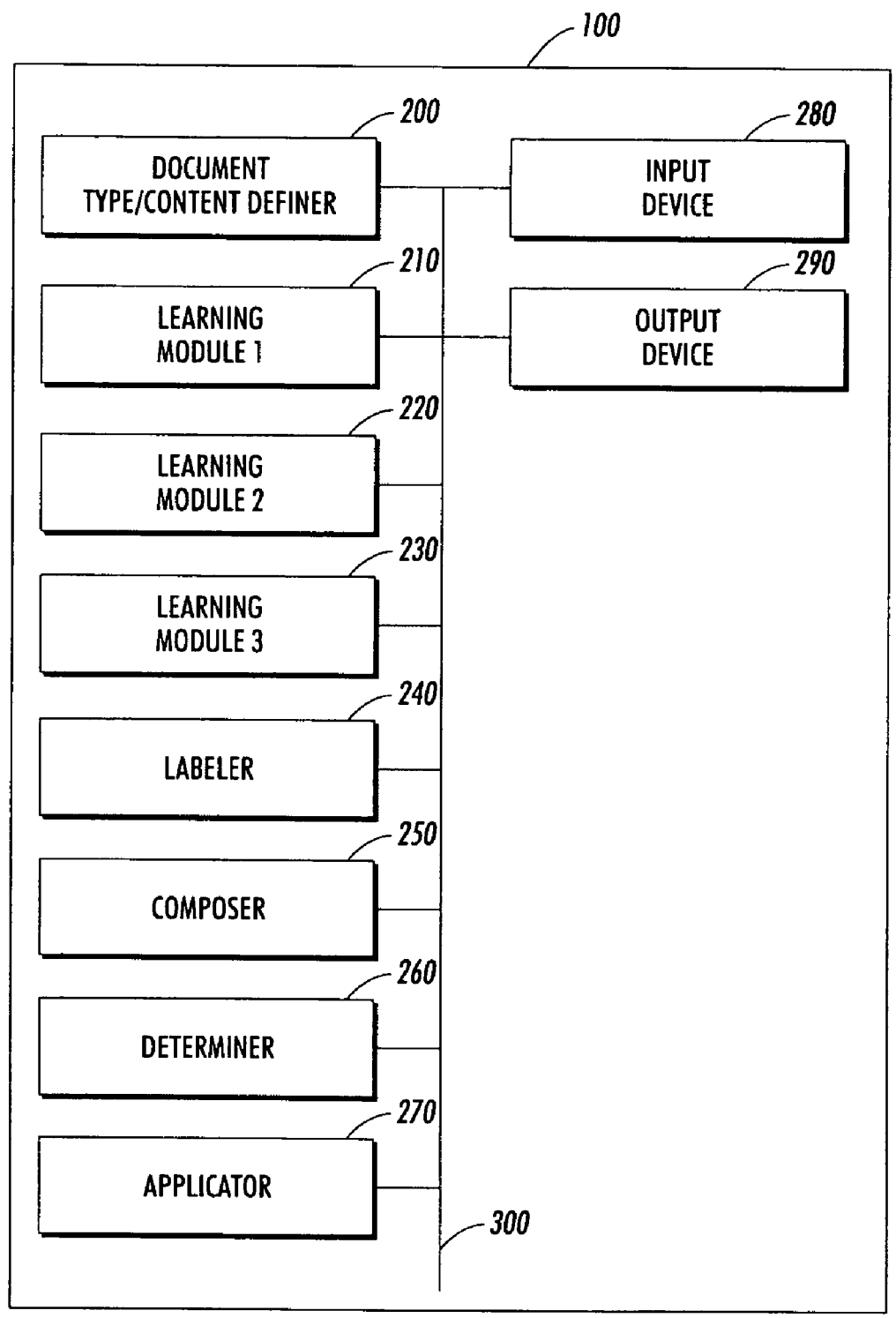
FIG. 14 is an exemplary embodiment of a conversion apparatus according to the invention.

FIG. 14 shows an exemplary embodiment of a conversion apparatus according to this invention. The conversion apparatus is in the form of a general purpose computer 100 with a number of components, including, a document type and/or document content definer 200, three learning modules 210, 220 and 230, a labeler 240, a composer 250, a determiner 260, an applicator 270, an input device 280, an output device 290 and a bus 300. The system for document conversion according to various exemplary embodiments of this invention may be implemented in software on a general purpose computer or may be made of hardware with individual components, for example, shown in FIG. 14.

Document type/content definer 200 may be any suitable device, circuit or routine that is capable of creating input document type and/or content definitions in a first format, such as, for example, a first XML format, as well as creating output document type and/or content definitions in a second format, such as, for example, a second XML format. Learning modules 210, 220 and 230 may be any devices, circuits or routines that are respectively capable of learning path relabeling rules, structural composition rules and input tree traversal rules. Labeler 240 may be any device, circuit or routine that is capable of labeling input document tree nodes. Composer 250 may be any device, circuit or routine that is capable of composing labeled input document schema tree nodes into an output document schema. Determiner 260 may be any device, circuit or routine that capable of determining traversal of an input document schema tree that obtains a correct composition of an output document tree and correct application of structural rules. Applicator 270 may be any device, circuit or routine that is capable of applying a determined traversal to transform an input document to an output document. Input device 280 may be any device, circuit or routine that is capable of acquiring input document data and output device 290 may be any device, circuit or routine that is capable of displaying and/or otherwise utilizing the output of any of the system components 200-280. Bus 300 may be any device, circuit or routine that is capable of providing an interconnection between the elements 200-290.

It is to be understood that the specific exemplary embodiments of the invention which have been disclosed are merely illustrative examples of the principles of this invention. Numerous modifications may be made to the systems and methods disclosed above without departing from the true spirit and scope of the subject matter of the invention.

TABLE 1

| | Input Document Path Pattern | Output Document Label | Structure Action Before | Struction Action After |
|---|---|---|---|---|
| 1. | /tbody/tr/td/span | /curr/competence | Create curr | Close curr/competence |
| 2. | /tbody/tr/td/span/b | /curr/formation/elem/annee | Create curr/formation/elem | |
| 3. | /tbody/tr/td/span/i | /curr/formation/elem/titre + ':' + /curr/formation/elem/affiliation | | Close curr/formation/elem |
| 4. | tbody/tr/td/span/[2] | none | | |
| 5. | /tbody/tr/td/b | none | | |

What is claimed is:

1. A method of decomposing a two-dimensional structured representation of an input document using multiple one-dimensional methods, comprising:

creating an input document schema tree with nodes;

deriving a set of valid input paths in the two-dimensional structured representation of the input schema and a set of valid output paths in a two-dimensional structured representation of an output schema;

determining a first mapping and/or re-labeling function from the input paths into the output paths, applying suitable classification rules; and determining a second mapping and/or re-labeling function from the suitable classification rules to structural actions;

wherein determining a first mapping and/or re-labeling function from the input paths into the output paths, applying suitable classification rules, comprises:

establishing leaf extraction rules that include one-dimensional simple path leaf delimiter candidates, associated classification labels, and associated confidence levels;

storing path candidates in a candidate index wherein the candidate index is in the form of a tree data structure that stores all simple path delimiter candidates, the simple path delimiter candidates including reverse path delimiters, and the candidate index stores information sufficient to determine the most discriminative delimiters;

where the candidate index allows incremental accommodation of new annotated samples;

determining, for each leaf, which leaf delimiter candidate has a highest confidence level;

determining a classification label for the leaf content based on the leaf delimiter candidate having the highest confidence level; and providing a classification label for each leaf with respect to which leaf delimiter has the highest confidence level to achieve a valid two-dimensional tree according to the output schema.

2. The method of claim 1, wherein the input document schema tree is an unranked structure.

3. The method of claim 1, wherein the creating an input document schema tree includes annotating a subset of the input document schema tree into a binary tree.

4. A system for decomposing a two-dimensional structured representation of an input document using multiple one-dimensional methods, comprising:

a creator to create an input document schema tree with nodes;

a deriver to derive a set of valid input paths in the two-dimensional structured representation of the input schema and a set of valid output paths in a two-dimensional structured representation of an output schema;

a determiner to determine a first mapping and/or re-labeling function from the input paths into the output paths, applying suitable classification rules; and a determiner to determine a second mapping and/or re-labeling function from the suitable classification rules to structural actions;

wherein the determiner to determine a first mapping and/or re-labeling function from the input paths into the output paths, applying suitable classification rules, comprises:

an establisher to establish leaf extraction rules that include one-dimensional simple path leaf delimiter candidates, associated classification labels, and associated confidence levels;

a storage device to store path candidates in a candidate index wherein the candidate index is in the form of a tree data structure that stores all simple path delimiter candidates, the simple path delimiter candidates including reverse path delimiters, and the candidate index stores information sufficient to determine the most discriminative delimiters;

where the candidate index allows incremental accommodation of new annotated samples;

a determiner to determine, for each leaf, which leaf delimiter candidate has a highest confidence level;

a determiner to determine a classification label for the leaf content based on the leaf delimiter candidate having the highest confidence level; and provider to provide a classification label for each leaf with respect to which leaf delimiter has the highest confidence level to achieve a valid two-dimensional tree according to the output schema.

5. The system of claim 4, wherein the input document schema tree is an unranked structure.

6. The system of claim 4, wherein the creator to create an input document schema tree includes an annotator to annotate a subset of the input document schematic tree into a binary tree.

* * * * *